United States Patent Office 3,207,159
Patented Sept. 21, 1965

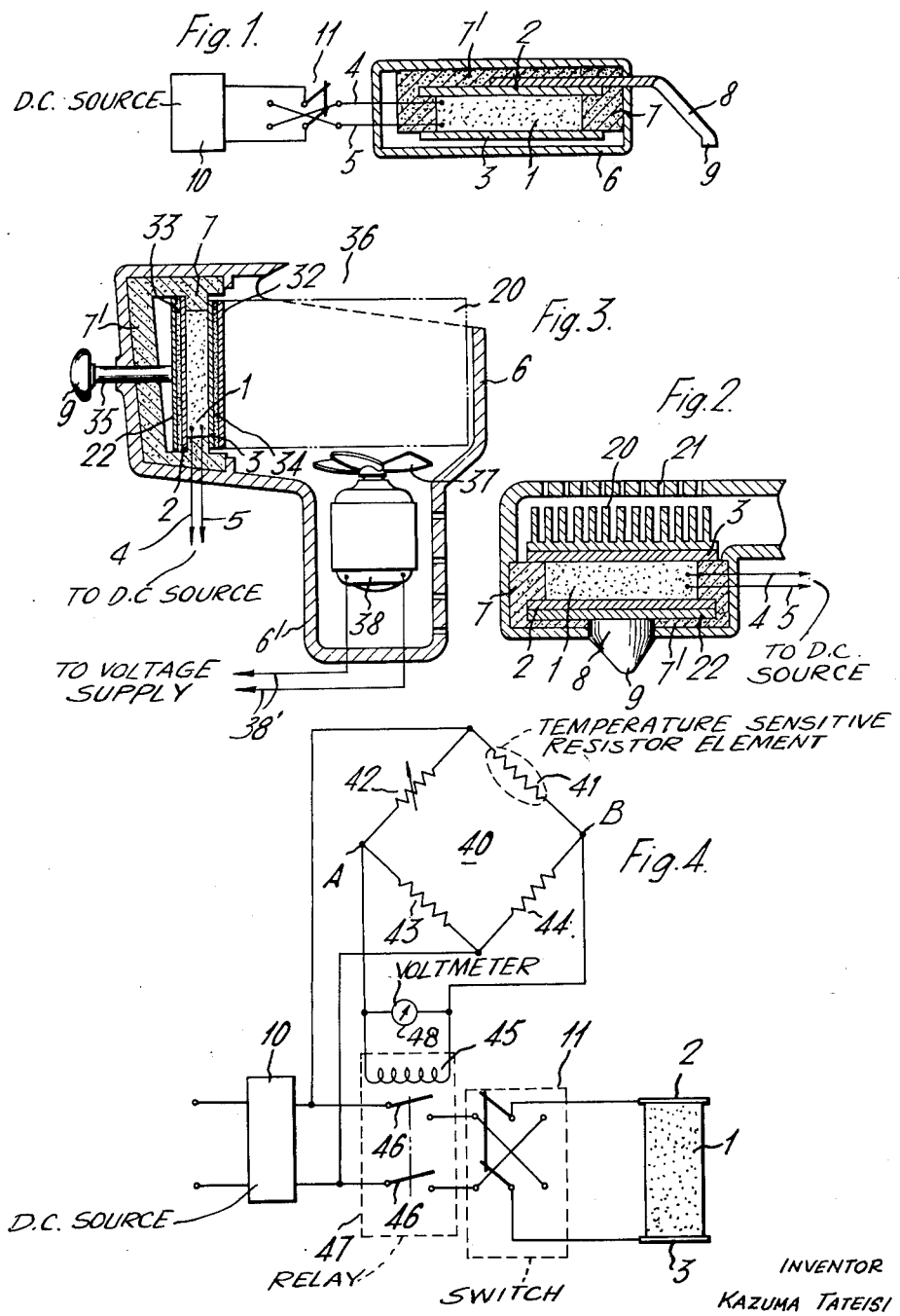

3,207,159
THERMOELECTRIC THERAPEUTIC
INSTRUMENT
Kazuma Tateisi, Ukyo-ku, Kyoto, Japan, assignor to Tateisi Denki Kabushikikaisha, Ukyo-ku, Kyoto, Japan, a corporation of Japan
Filed Nov. 13, 1962, Ser. No. 237,035
Claims priority, application Japan, June 14, 1962, 37/24,844
2 Claims. (Cl. 128—303.1)

This invention relates generally to therapeutic instruments and more particularly to an instrument for applying to predetermined cutaneous points on the human body thermal or cold stimulation thermoelectrically produced.

It is one object of the invention to provide an instrument for thermoelectrically evolving or absorbing heat for application of hot or cold stimulation to the human body wall. In accordance with the invention, the evolution or absorption of heat originates in thermoelements due to the Peltier effect. Accordingly, it is a particular advantage of the invention that by controlling electric current to be passed through the thermoelements, the amount of heat to be evolved or absorbed and consequently the strength of the stimulus to be applied to the skin can be varied.

Another object is to provide such an instrument wherein by reversing the direction of the current flow, the cold junction of the thermoelement can be easily changed into a hot one, and the hot junction thereof into a cold one, thereby making it possible to selectively provide a hot or a cold stimulus at one and the same junction. Still another object is to provide such an instrument which is sanitary because it can be easily cleaned or sterilized.

Another object of the invention is to provide such an instrument as aforesaid, which is provided with automatic control means by which the amount of heat to be evolved from, or absorbed by the thermoelements is controlled by the amount of heat given to, or absorbed from the body wall, whereby absorption or evolution of too much or too little heat is prevented.

Another object of the invention is to provide an instrument as aforesaid, in which the junction which is in practice used to generate the hot or cold condition is protected against the influence of the atmospheric temperature, thereby raising the efficiency of the thermoelements.

These and other objects, features and advantages of the invention will be more apparent from the following detailed description thereof with reference to the accompanying drawings in which:

FIG. 1 is a sectional view of one embodiment of the invention;

FIG. 2 is a sectional view of another embodiment of the invention;

FIG. 3 is a sectional view of still another embodiment of the invention; and

FIG. 4 is a diagram of one form of the circuit for controlling electric current supplied to the thermoelements used in the instrument of the invention.

In the illustrated embodiments, the instrument constructed in accordance with the invention is characterized by the provision of thermoelements and a member of thermal conducting material so responsive to the thermoelectric effect thereof as to be heated or cooled thereby, depending upon the direction of the current flow therethrough, said member being formed with a skin-contacting portion to be brought into contact with certain designated cutaneous points to be stimulated.

Referring now in detail to the drawings, there is provided a thermo-module or Peltier effect means 1 comprised of a plurality of thermoelements which evolve heat at one junction and absorb heat at the other when a current is passed therethrough. The thermo-module 1 is provided with conducting members which are shown as a pair of plates 2, 3 fixed to the opposite ends of the thermo-module. It will be easily seen that each of these plates is either heated or cooled when the other is either cooled or heated, depending upon the direction of the current flow through the thermo-module.

The thermo-module 1 and plates 2, 3 are housed in a casing 6 of a shape suitable to be gripped by the hand. For the reasons given later, the temperature of each of these two plates should be kept as free as possible from that of the other. To this end, a thermal insulator 7 is placed between the two plates 2 and 3.

A rod 8, made of thermal conducting material and suitably bent, is connected at one end to the plate 2 and projects out of the casing 6, terminating at the other in a skin-contacting portion or probe 9, which is to be applied to cutaneous points to be stimulated. It will be observed that the skin-contacting portion or probe 9 will be in thermal equilibrium with the plate 2.

The plate 2 is sealed on all sides except where it is affixed to the thermo-module by a thermal insulator 7' against thermal transfer to or from the ambient air. On the other hand, the plate 3 is exposed to the ambient temperature so as to be easily influenced thereby, so that the temperature of the plate 3 is mostly determined by that of the ambient atmosphere. It is desirable to be able to set the ambient temperature to any desired level.

When absorption of heat takes place at the plate 2 and evolution of heat at the plate 3, that is, when the former plate is cooled and the latter heated, the efficiency of absorption of heat at the plate 2 can be raised by rendering the temperature of the plate 3 as low as possible. One way to decrease the temperature of the plate 3 is to make the ambient temperature as low as possible relative to that of the plate 3 in order that heat transfer from this plate to the outside air may be accelerated.

On the other hand, when the plate 2 is heated, its temperature rises, and Joule heat generated in the Peltier effect means or thermomodule 1 causes the temperature to rise higher and higher. This unwanted temperature rise may be prevented by controlling the current passing through the thermo-module, the uncovered state of the plate 3 being somewhat helpful in this respect.

A direct current source 10 is connected by lines 4, 5 to the thermo-module. The direct current source is preferably designed in such a manner that its output can be freely regulated. A switch means 11 for reversing the polarity of the current to be passed through the thermo-module is preferably connected in the lines 4, 5, so that a single skin-contacting probe may be used for providing both a hot and a cold stimulus as in the illustrated embodiments.

In operation, when a direct current is passed through the thermo-module, a heating is effected at one of the plates 2, 3 while a cooling at the other due to the Peltier effect. Now assuming the plate 2 to be absorbing heat, that is, it is being cooled, the skin-contacting probe 9 of the member 8 connected to this plate 2 is also cooled by thermal conduction. Then the probe 9 may be held in close contact with the skin so as to apply a cold stimulus thereto.

On the contrary, when the plate 2 evolves heat, the heat is conducted through the conducting member 8 to the probe 9, which is in turn heated. Then this portion may be applied to the skin so as to give a hot stimulus thereto. In order to change the cold plate into a hot one or the hot plate into a cold one, the switch 11 is operated to reverse the polarity or direction of the current to be passed through the thermo-module.

FIG. 2 shows a modification of the construction shown in FIG. 1. It is especially intended in this modification that the plate 3 be easily kept at ambient temperature. For this purpose a heat-radiating member 20 with a plurality of fins formed thereon is attached to the plate 3, and a plurality of small holes 21 are formed in a suitable area on the wall of the casing 6 facing the fins. As described before, when the instrument is so operated as to cause the plate 2 to absorb heat or be cooled in order to provide a cold stimulus to be given to the skin, the plate 3 evolves heat. The heat is conducted to the fins, from which it is further dissipated into the air through the holes 21 formed in the wall of the casing 6. In this manner the plate 3 continues to be deprived of heat, that is, it continues being cooled, so that the efficiency of absorption of heat at the plate 2 is the more raised. On the other hand, when the plate 2 is heated to provide a hot stimulus, the plate 3 is cooled and absorbs heat. However, because of Joule heat generated in the thermo-module, the temperature of the plate 2 and also that of the plate 3 tend to rise infinitely. It is therefore necessary to prevent this unwanted temperature rise. To do this, the current flow through the thermo-module is controlled. Then, with the fins 20 and holes provided in the above-mentioned way for accelerating heat transfer from the plate 3 to the outside air, the plate 3 is kept nearly at ambient temperature and the plate 2 is maintained at a temperature level which it has then.

In FIG. 2 the thermal conducting member 8 is shown of a different shape from that in FIG. 1, and comprises a short cylindrical member having it inner end connected to a heat-conducting plate 22 attached to the plate 2 and its outer end projecting out of the casing 6 and formed into a cone, the rounded apex of which is to contact the skin to give it a required stimulus.

FIG. 3 shows another modified embodiment of the invention suitable for practical use. In this embodiment the casing 6 is formed with a projecting portion 6' suitable to be held by the person who handles it. The whole appearance may resemble a pistol. Inside the casing the thermo-module 1 and the plates 2, 3 attached thereto are positioned as with the previous two embodiments. To these plates 2, 3 are affixed good heat-conducting plates 22, 32 respectively. The plates 2 and 22 and plates 3 and 32 are stuck together respectively with suitable material such as silicone grease put therebetween as at 33 and 34 in order that not a tiny gap may be left therebetween, thereby assuring thermal conduction between each pair of plates. A rod 35 made of heat-conducting material is connected at one end to the plate 22 and provided at the other end outside the casing 6 with a skin-contacting probe 9. The plate 32 is provided with radiator plates 20. In the wall of the casing 6 is formed a window 36 through which heat may easily escape from the plates 20 into the outside air. In order to accelerate the heat dissipation, fan 37 and a driving motor 38, energized by a suitable voltage supply (not shown) through leads 38', are provided within the projecting portion 6' of the casing. A thermal insulator 7' covers up the plates 2, 22 to protect them against influence of the atmospheric temperature. In like manner a thermal insulator 7 separates the plates 2 and 3 to protect each of them against influence of the temperature of the other.

When it is desired to give a cold stimulus to the skin, a current is passed through the thermo-module in such a direction that the plate 2 and consequently the skin-contacting probe 9 absorb heat, that is, they are cooled. Then the plate 3 evolves heat, which is transferred to the radiator plates 20. If the temperature of the plates 20 is higher than the ambient temperature, as is usual, the heat is dissipated therefrom through the window 36 of the casing 6 into the outside air. It is quite obvious that rotation of the fan 37 accelerates the heat dissipation, because it forces air to circulate around and through the plates 20 to carry the heat away therefrom. In this way the temperature of the plates 20 and consequently plates 32, and 3 approaches and finally arrives nearly at the temperature of the ambient atmosphere. It will be easily seen that prevention of the temperature of the hot plate 3 from rising above a predetermined level necessarily results in maintenance of the temperature of the cold plate 2 at a desired fixed low level.

When hot stimulation is required, a current is passed through the Peltier effect thermo-module in the direction opposite to that in which it is passed when cold stimulation is obtained. Then the plate 2 is heated, evolving heat. With Joule heat generated in the thermo-module, the temperature of the plate 2 tends to rise infinitely, causing the temperature of the plate 3 to rise accordingly at the same time. In order to prevent the overheating of the plates, the current passed through the thermo-module is controlled, with simultaneous rotation of the fan 37 to accelerate heat dissipation from the plates 20.

It is desirable to be able to predetermine the temperature of hot or cold stimulation to be given to the skin, that is, the temperature level to be reached by the skin-contacting probe 9, and automatically keep it at the predetermined level. A circuit arragement for this purpose is diagramatically shown by way of exampe in FIG. 4, wherein there is provided means for detecting the temperature of that plate with which the skin-contacting probe 9 is arranged in thermal equilibrium, and comparing the detected temperature with a predetermined temperature at which it is desired to stimulate the skin. As illustrated in FIG. 4, this means comprises a bridge 40 and a relay means 47.

One of the arms of the bridge consists of an element 41 such as a thermistor whose value of resistance varies according as its temperature varies. The element is positioned sufficiently adjacent to the thermo-module for its temperature to respond to that of the thermo-module. Another arm of the bridge consists of a variable resistor 42 for pre-selecting a temperature level to be attained by the skin-contacting portion 9. The remaining two bridge elements are resistors 43 and 44 of fixed values, respectively.

The relay means 47 comprises an actuating coil 45 and contacts 46 movable whereby to control the current supply from the source 10 to the thermo-module. The actuating coil is connected across the opposite points A and B of the bridge, and the contacts are interposed in the supply lines from the source 10 to the thermo-module. The source is also connected across the other opposite points of the bridge.

The bridge 40 and relay 47 are so constructed and arranged that when the temperature of the plate 2 has reached a predetermined level, the contacts 46 of the relay are opened to break the supply lines. Suppose for example that the bridge is so designed as to come to be balanced when the plate 2 has reached a predetermined temperature. Unless the predetermined temperature has been reached, the bridge is kept unbalanced and exciting current continues to flow through the actuating coil 45 to keep the contacts 46 closed, thereby keeping the thermo-module supplied with current fom the source 10, so that absorption or evolution of heat continues at the plate 2. When the plate 2 has attained the predetermined temperature level, the bridge is balanced, so that no exciting current flows through the coil and the contacts 46 are opened to cut off the supply of current to the thermo-module. In this manner, according to the invention, the supply of current to the thremo-module is automatically controlled so that the temperature of the plate 2 will be kept at a pre-set level, whereby too great a stimulus is prevented from being given to the body wall.

A voltmeter 48 may be connected across the points A, B of the bridge to indicate the temperature of the plate 2 in terms of potential differences appearing between the points A and B.

It is apparent that the present invention has provided a new and useful instrument capable of thermo-electrically providing hot or cold stimulation to be applied to the skin. It should be recognized that the embodiments disclosed herein are merely representative and that further modifications and changes may be made.

What is claimed is:

1. A selective heating or cooling skin therapy instrument comprising a thermally conductive skin contact probe, two heat exchange members, one being thermally connected to said probe and together therewith thermally insulated from the other member, and further insulated from atmospheric conditions, said other member being exposed in heat exchange relationship to atmospheric conditions for maintaing said latter member substantially at atmospheric temperature, Peltier effect means interposed between the heat exchanger members, a direct current source of reversible polarity energizingly connected to said Peltier effect means thereby to selectively heat or cool said one member above or below atmospheric temperature, temperature control means including a temperature sensitive element in thermal communication with said probe, and means controlled thereby in said source for limiting probe temperature to a predetermined level above or below atmospheric temperature as selected.

2. The instrument defined in claim 1 wherein said temperature control means comprises relay means and suitable means responsive thereto operable to interrupt the supply of direct current, and a bridge circuit for operating said relay means, said bridge circuit containing said temperature sensitive element as one arm thereof and further including variable resistance means in another arm thereof calibrated to render relay operating balance conditions in said bridge selectable.

References Cited by the Examiner

UNITED STATES PATENTS

| 2,447,127 | 8/48 | Landauer | 128—405 |
| 2,584,302 | 2/52 | Stein | 128—399 X |
| 2,798,493 | 7/57 | Sukacev | 128—379 |
| 2,938,356 | 5/60 | McMahon | 62—3 |
| 3,008,299 | 11/61 | Sheckler | 128—400 X |
| 3,080,723 | 3/63 | Price | 128—387 X |
| 3,085,405 | 4/63 | Frantii | 128—144 X |
| 3,093,135 | 6/63 | Hirschhorn | 128—303.1 |
| 3,133,539 | 5/64 | Eidus | 128—399 |
| 3,140,716 | 7/64 | Harrison | 128—399 |

FOREIGN PATENTS 1,262,837   4/61   France.

RICHARD A. GAUDET, *Primary Examiner.*

JORDAN FRANKLIN, *Examiner.*